Jan. 27, 1931.　　　M. HARRISON　　　1,790,345
ADVERTISING DEVICE
Filed Oct. 21, 1925　　3 Sheets-Sheet 3
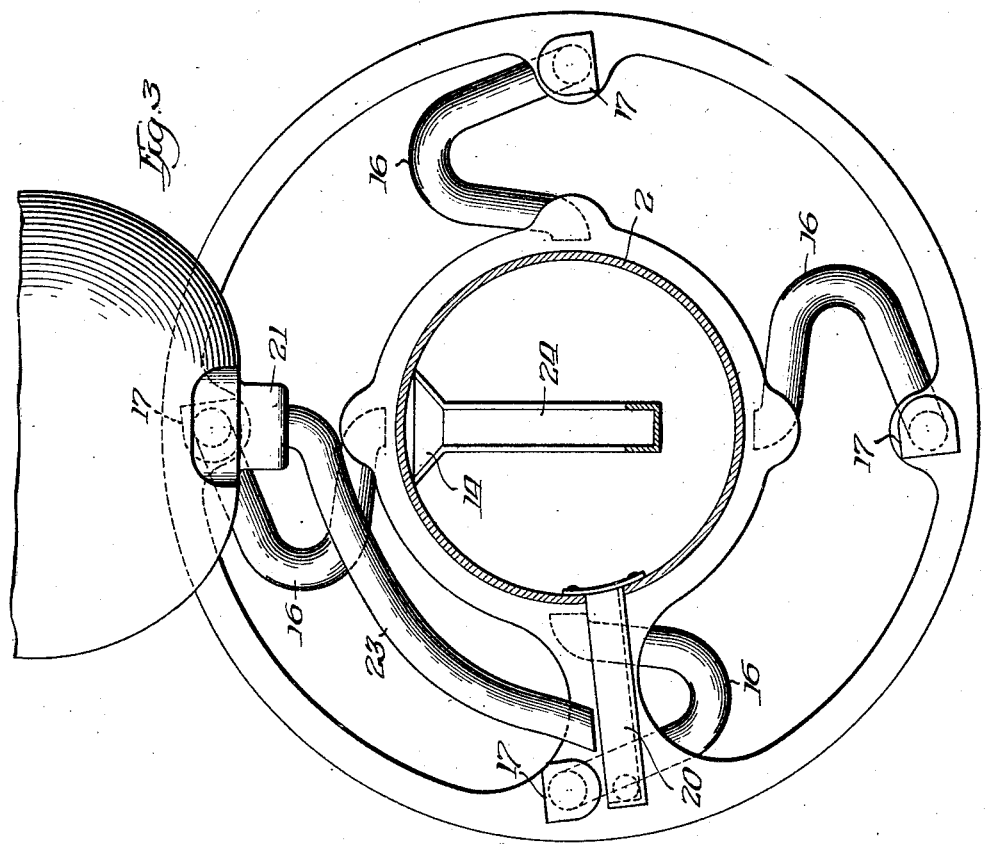
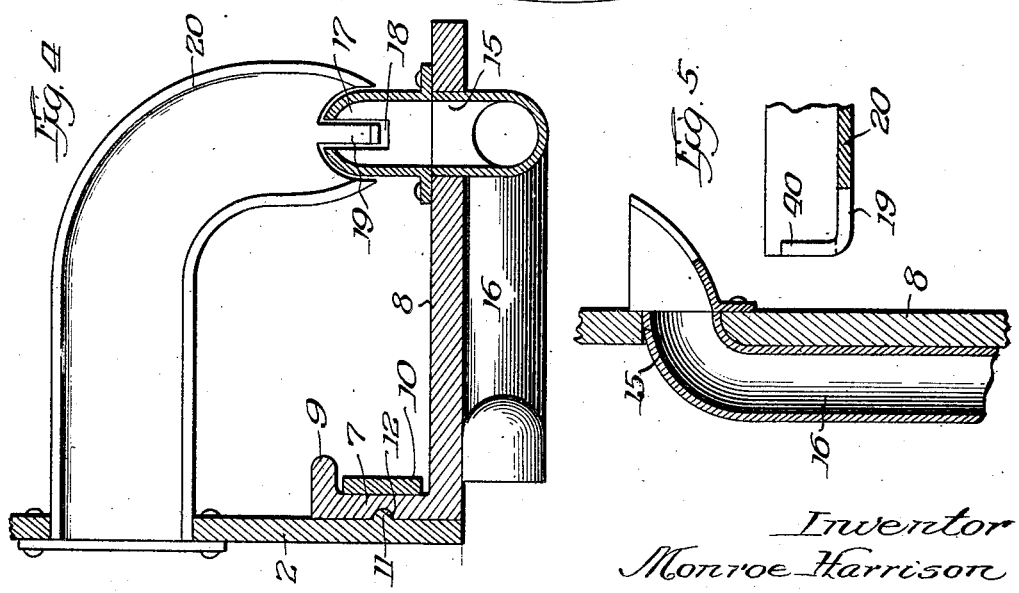
Inventor
Monroe Harrison Patented Jan. 27, 1931

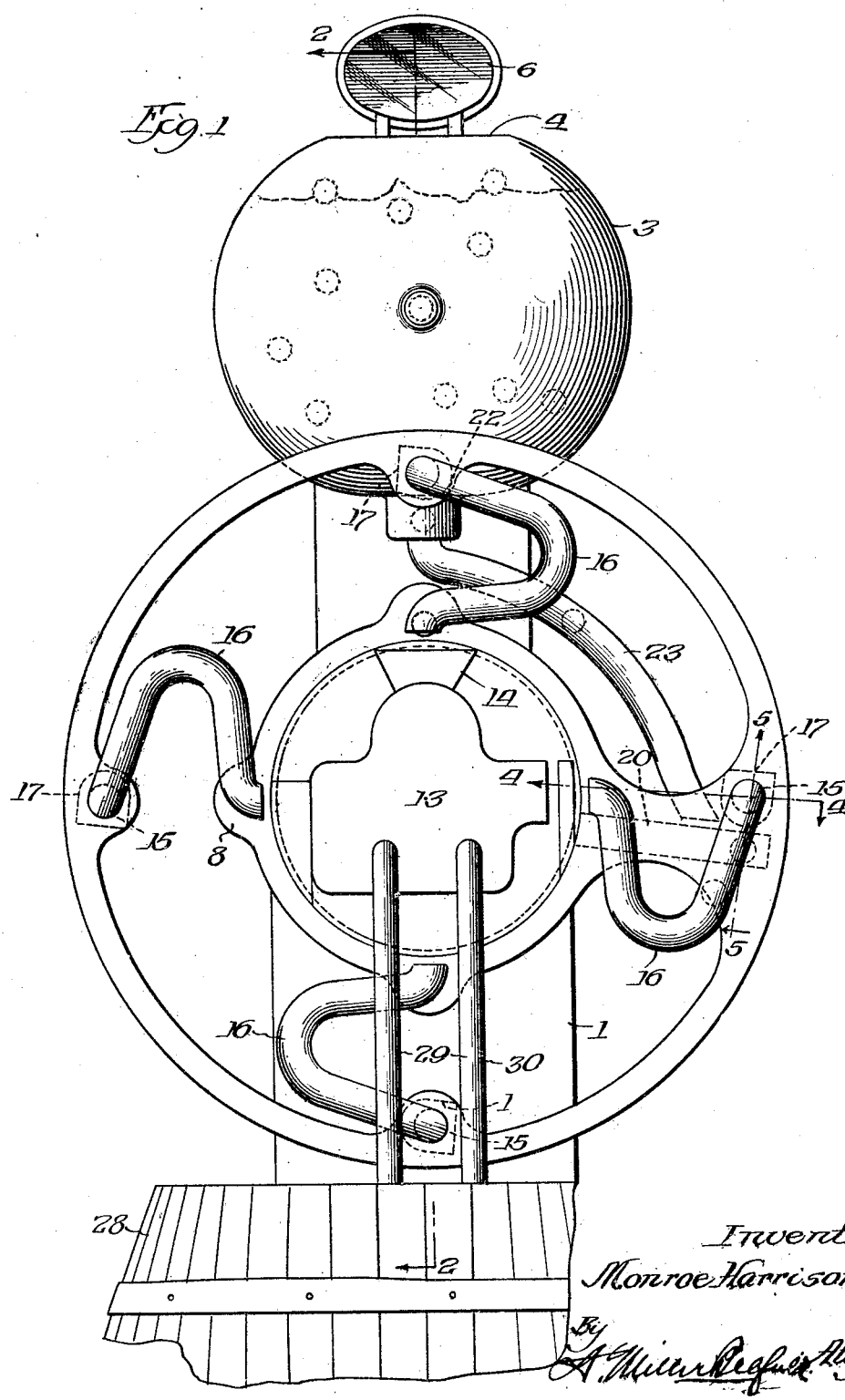

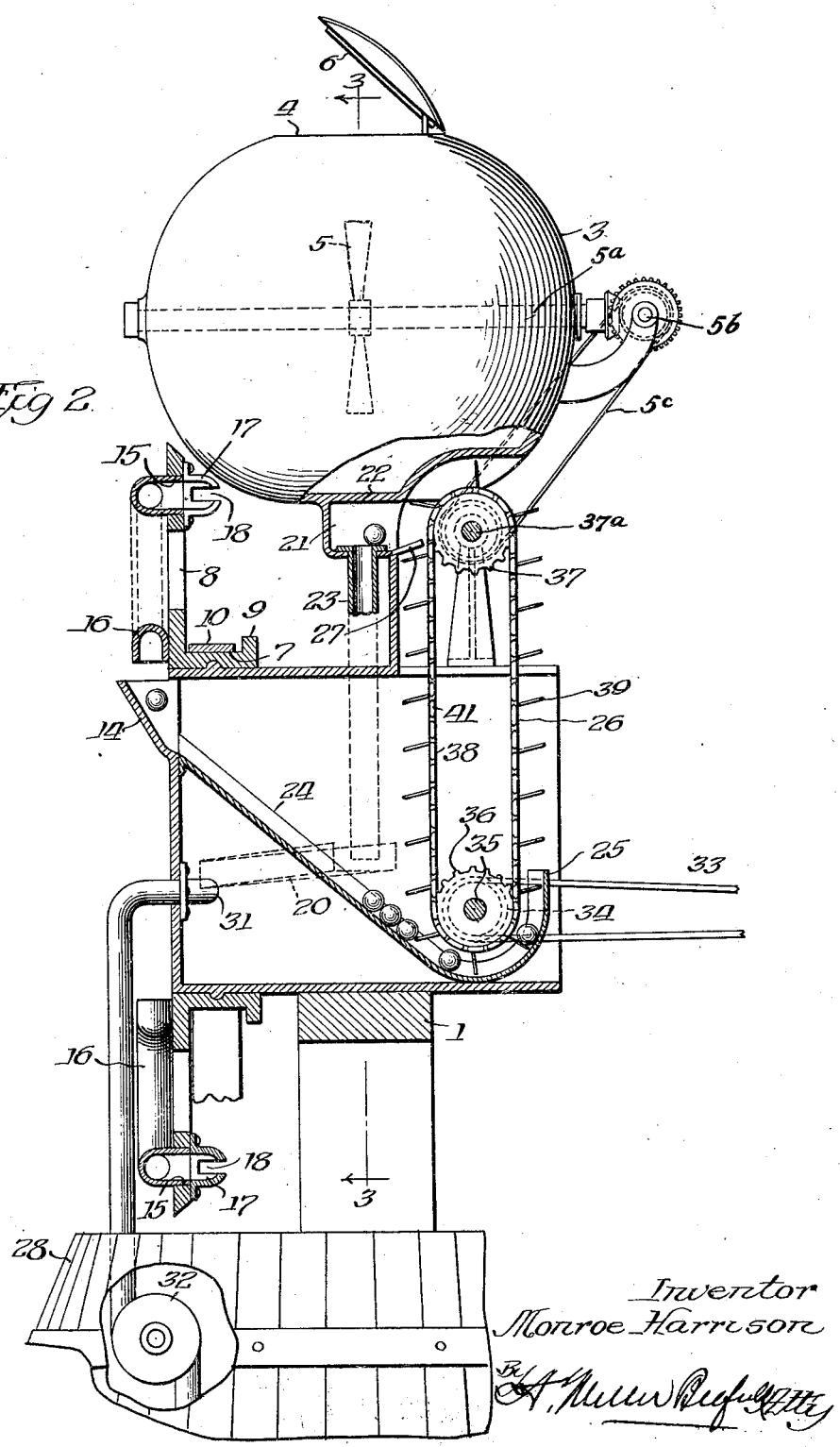

1,790,345

UNITED STATES PATENT OFFICE

MONROE HARRISON, OF CHICAGO, ILLINOIS

ADVERTISING DEVICE

Application filed October 21, 1925. Serial No. 64,050.

My invention relates to advertising machines and particularly to machines for advertising fruit juice or drinks.

One of the objects of the invention is to provide a simple, practical and advantageous form of advertising machine.

Another object of the invention is to arrange for the movement of various articles, such as the fruit from which the drinks are made in order to attract attention.

Another object of the invention is to arrange for the appearance of washing the articles such as fruit preparatory to using the same for making the drink.

Another object of the invention is to arrange for the appearance of actually preparing the article to be dispensed, such as fruit juice drinks, in full view.

In the accompanying drawings Fig. 1 is a front elevation of a machine embodying the invention;

Fig. 2 is a vertical section taken on line 2—2 in Fig. 1;

Fig. 3 is a rear elevation of a part of the device;

Figs. 4 and 5 are cross sections taken on lines 4—4 and 5—5 in Fig. 1.

Referring to the drawings, a main stand 1 supports a housing 2 above which is a receptacle 3, preferably spherical in shape, and adapted if desired to give the appearance of a large orange or similar fruit. The receptacle 3 is provided at its upper end with an opening 4 and contains an agitator 5, to which movement is imparted so as to cause a constant agitation of the water and fruit articles arranged within receptacle 3. As one arrangement for driving agitator 5 I show a rotary shaft 5a carrying said member 5 and driven by gear and pinion connection with rotary shaft 5b, which is in turn driven by belt 5c, from rotary shaft 37a carrying sprocket 37, reference to which will be made later herein.

Arranged above opening 4 and positioned so that the same may be viewed from the front of the machine is a mirror 6, said mirror being so positioned as shown in Fig. 2, that the interior of the receptacle may be readily viewed from the front of the machine; and in order to give the appearance of washing the fruit from which the juice is to be removed a quantity of liquid cleansing material is placed within the receptacle and a predetermined quantity of fruit is placed within the cleansing liquid and through rotation of the agitator 5 the appearance from the mirror 6 discloses the cleansing of the fruit.

Mounted upon the housing 2 at the forward end thereof is a pulley 7 having outstanding flanges 8 formed at its outer edge to provide spaced ears on the pulley and an additional flange 9 is formed upon the inner edge of the pulley providing a channel or trough for receiving the belt 10 which may be connected to any suitable source of power for imparting movement to the pulley. To further prevent lateral movement of the pulley 7 with respect to the housing 2 an annular rib 11 is formed upon the exterior of the housing and is fitted within a recess 12 formed in the inner face of the pulley 7, thus retaining the pulley in position on the housing 2.

The front closed end of the housing 2 is stamped or formed so as to give the general appearance of a grinding device as at 13, said grinding device having a hopper 14 for receiving fruit or other articles to be ground. The hopper is formed by bending or stamping out the metal forming the closed end of the housing, as clearly illustrated in Fig. 2, the hopper standing out from the closed end of the housing.

The flanges 8 of the pulley 7 are provided with the openings 15 and extending through these openings are the outer ends of the tubes 16, the tubes being secured upon the front faces of the flanges 8 and preferably of a substantially U-shaped form as illustrated in Fig. 1. As shown in Fig. 2 the ends of the tubes 16 which extend through the openings 15 are provided with receiving shoes 17, each receiving shoe having a central slot 18 formed therein to permit the passage of a tongue 19 formed in the outer end of the trough 20 whereby it will be apparent that as each of the receiving shoes 17 passes the outer end of the trough 20 the tongue 19 will pass through the slot 18.

The trough 20 is so positioned that the inner end thereof extends through the wall of the housing 2 and is secured thereto in any suitable manner. The receptacle 3 is provided upon its lower side with an extension 21 separated from the main receptacle by the partition 22 and leading from the extension is a conveying pipe or in other words a discharge pipe 23, the lower end of which is arranged directly above the trough 20 and from this it will be apparent that the fruit after being removed from the outer end of the trough 20, is conveyed upwardly through the rotation of the pulley 7 and when the tubes 16 are arranged directly above the grinding device 13 the fruit within the tube will be deposited in the hopper 14 of the grinding device and after being received in the hopper it is discharged down the chute 24 to the curved portion 25 thereof and in order to convey the fruit from the curved portion 25 of the chute an endless conveyor 26 is provided which carries the fruit upwardly from the open side of the extension 21, thus conveying the fruit from the curved portion 25 of the chute to the extension 21 on the receptacle 3 and allowing the same to pass downwardly through the discharge pipe 23 and into the trough 20, after which the same operation will be carried out with each one of the tubes 16.

In order to give the appearance of conveying the fruit juice from the grinding device 13 to a receptacle 28 the pipes 29 and 30 are provided, the inner ends of which project through the front or closed end of the housing 2 and are coupled together as at 31 at the upper ends and arranged in the lower ends is a suitable pump 32 whereby the liquid within the pipes 29 and 30 may flow downwardly through the pipe 29 and be pumped back up through the pipe 30, thus giving the impression to the public that the juice from the supposedly crushed fruit is flowing downwardly into the receptacle 28.

From the foregoing it will be readily apparent that a view from the front of this machine will readily give the impression that the crushed fruit is being crushed and the juice therefrom conveyed into the receptacle 28 and as this appears to be a continuous operation it will give the appearance of the serving of fresh juice at all times.

The tubes 16 are transparent, that is, they may be made of glass or other transparent material of suitable weight to withstand usage so as to display to the public the fact that the fruit is received in the shoe end of the tube and discharged into the hopper 14 of the grinding device.

Attention is also directed to the fact that the endless conveyor 26 may be driven through the medium of a belt 33 which received its power from any suitable source and passes around a pulley 34 in the shaft 35 which supports the sprocket 36, said sprocket being connected to a second sprocket 37 through the conveyor chain 28 whereby movement will be imparted to the endless conveyor 26. Flights 39 which are attached to the chain 38 are of a construction to readily permit them to pass through the fingers 27 so as to deposit an individual article upon the fingers and convey them into the extension 21. The outer end of the trough 20 is provided with an upstanding flange and this end of the trough is cut to permit the passage therethrough of the outer ends of the shoes 17 and as the tongue 19 is provided with an outstanding end 40 it will readily support the fruit in position at the outer end of the trough as one of the shoes passes therethrough to remove the fruit.

It will be understood that changes and modifications may be made without departing from the spirit of the invention.

What I claim is:

1. A machine of the class specified having a housing, a frame movably mounted thereon arranged for carrying fruit articles; a receptacle above said housing adapted for and containing fruit articles, said receptacle having an aperture through which the articles therein may be seen; a mirror associated with said aperture so as to visually reflect to an observer the articles inside of the said receptacle.

2. A machine of the class specified the combination with a housing and a frame mounted for rotation thereon, said frame provided with visible article carrying passages; of a receptacle mounted above said housing and frame, said receptacle adapted to contain articles, an opening at the top of the said receptacle through which the articles therein may be seen; a mirror associated with said opening in said receptacle and arranged to reflect to an observer the contents of the receptacle; and a rotating agitator arranged within said housing.

In witness whereof, I hereunto subscribe my name this 2nd day of October, A. D. 1925.

MONROE HARRISON.